United States Patent
Lee

(10) Patent No.: US 7,672,205 B2
(45) Date of Patent: Mar. 2, 2010

(54) METHOD FOR VARIABLY CONTROLLING DATA READ SPEED IN OPTICAL DISC DRIVE

(75) Inventor: Ki Yeol Lee, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 1165 days.

(21) Appl. No.: 10/963,733

(22) Filed: Oct. 14, 2004

(65) Prior Publication Data

US 2005/0105885 A1 May 19, 2005

(30) Foreign Application Priority Data

Oct. 14, 2003 (KR) ............... 10-2003-0071395

(51) Int. Cl.
*G11B 7/00* (2006.01)
(52) U.S. Cl. ............... 369/47.41; 369/47.12
(58) Field of Classification Search .... 369/84; G11B 7/28
See application file for complete search history.

(56) References Cited

U.S. PATENT DOCUMENTS

| | | | |
|---|---|---|---|
| 5,313,443 A | 5/1994 | Iitsuka | |
| 5,434,991 A * | 7/1995 | Maeda et al. | 711/112 |
| 5,438,643 A | 8/1995 | Akagiri et al. | |
| 5,715,355 A * | 2/1998 | Yonemitsu et al. | 386/95 |
| 5,764,610 A * | 6/1998 | Yoshida et al. | 369/53.22 |
| 6,154,428 A | 11/2000 | Lee | |
| 6,195,322 B1 * | 2/2001 | Ohtani et al. | 369/53.14 |
| 6,396,998 B1 * | 5/2002 | Nozaki et al. | 386/52 |
| 6,538,967 B1 | 3/2003 | Lee | |
| 6,781,935 B1 * | 8/2004 | Kori et al. | 369/53.34 |
| 6,836,454 B2 * | 12/2004 | Sasaki et al. | 369/47.39 |
| 6,958,960 B2 * | 10/2005 | Sasaki | 369/47.28 |
| 6,977,878 B2 * | 12/2005 | Lee et al. | 369/47.38 |
| 6,987,716 B2 * | 1/2006 | Obinata et al. | 369/47.38 |
| 7,151,720 B2 * | 12/2006 | Geutskens | 369/44.26 |
| 7,242,642 B2 * | 7/2007 | Endo et al. | 369/30.05 |
| 7,301,867 B2 * | 11/2007 | Bahng | 369/47.38 |
| 2002/0015872 A1 | 2/2002 | Surampudi et al. | |
| 2002/0105872 A1 | 8/2002 | Sasaki et al. | |
| 2002/0136117 A1 | 9/2002 | Takahashi | |
| 2002/0176337 A1 * | 11/2002 | Obinata et al. | 369/47.39 |
| 2003/0051112 A1 * | 3/2003 | Gehr | 711/162 |

FOREIGN PATENT DOCUMENTS

CN 1358309 A 7/2002

OTHER PUBLICATIONS

H. Zander, "CD-Recording am PC," Fernseh- Und Kino-Technik, vol. 51, No. 3, Mar. 1997, pp. 132-141 (XP 000693299).

\* cited by examiner

*Primary Examiner*—Wayne R Young
*Assistant Examiner*—Adam R Giesy
(74) *Attorney, Agent, or Firm*—Birch, Stewart, Kolasch & Birch, LLP

(57) ABSTRACT

A method is provided for variably controlling a data read speed in an optical disc drive. The method includes determining whether or not a read command has been issued; if the determining step determines that the read command has been issued, examining additional information associated with the read command; and variably controlling a data read speed for an optical disc according to the additional information.

16 Claims, 3 Drawing Sheets

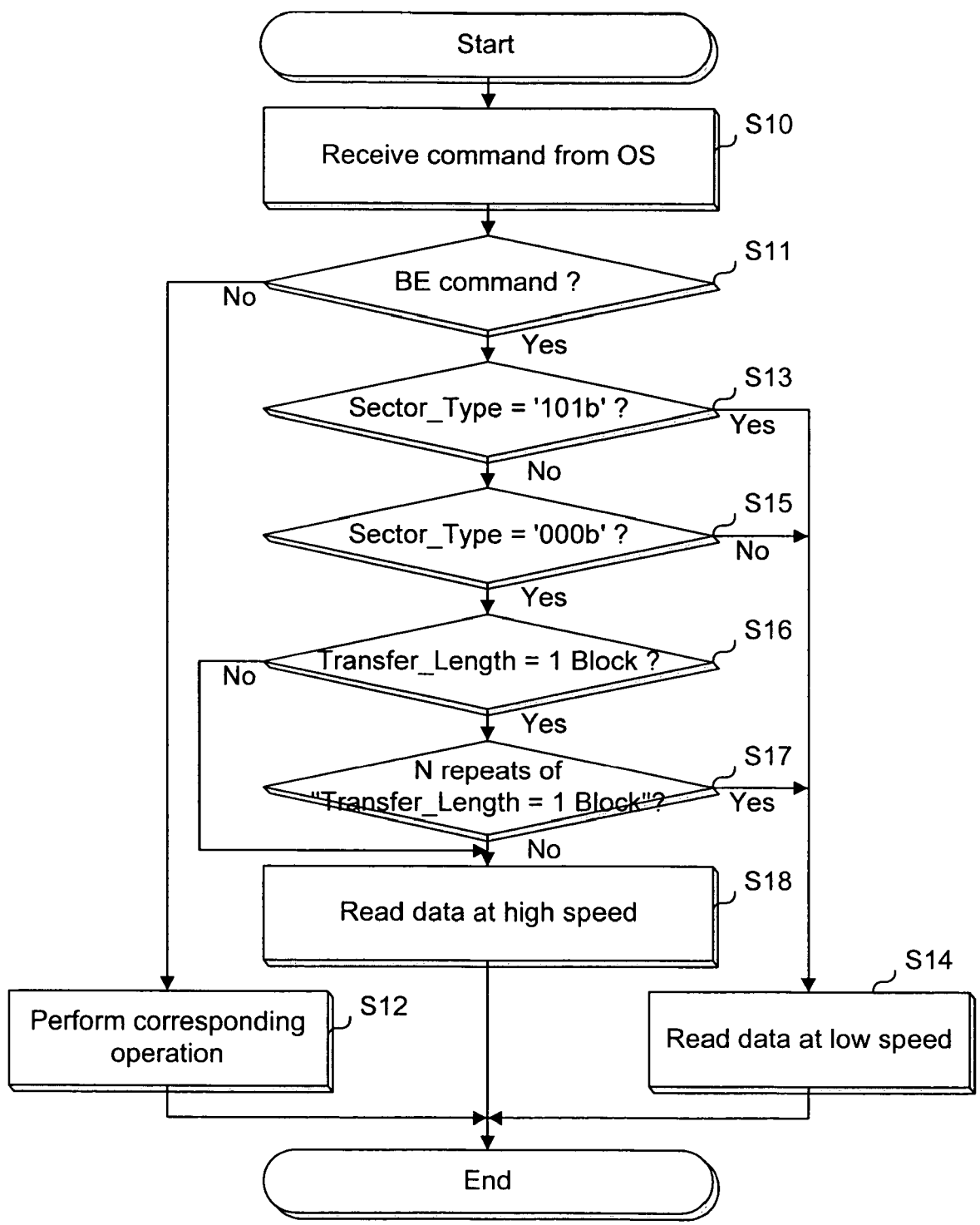

METHOD FOR VARIABLY CONTROLLING DATA READ SPEED IN OPTICAL DISC DRIVE

The present invention claims the benefit of Korean Patent Application No. 2003-71395 filed in Republic of Korea on Oct. 14, 2003, which is hereby incorporated by reference.

BACKGROUND OF THE INVENTION

1. Field of the Invention

The present invention relates to a method for variably controlling a data read speed in an optical disc drive, and more particularly to a method for variably controlling a data read speed so that a copy operation can be rapidly performed when video and audio data recorded on an optical disc such as a video compact disc (CD) are copied to another optical disc.

2. Description of the Related Art

Recently, optical discs capable of storing digital video and audio data, for example, video compact discs (CDs), are widely supplied. Moreover, optical disc drives capable of reproducing or recording data on optical discs have been commercialized.

An optical disc drive can be used in a state in which it is mounted in a personal computer (PC). In a state in which first and second optical disc drives are mounted and used in the PC, respectively, a user can copy data of a video CD inserted into the first optical disc drive to a recordable optical disc inserted into the second optical disc drive.

When the user makes a request for a video CD copy operation, an operating system (OS) within the PC issues a BE command defined in the advanced technology attachment packet interface (ATAPI) standard.

The first optical disc drive performs a series of playback operations to reproduce the video CD inserted therein, while the second optical disc drive performs a series of recording operations to record data on a recordable optical disc inserted therein. Thus, the user can conveniently copy the data from the video CD to the recordable optical disc.

However, when the conventional optical disc drive receives the BE command from the OS to perform a video CD copy operation, the video CD inserted into the disc drive is reproduced at a preset data read speed, for example, a low data read speed of about 2×, which is the data read speed of the normal playback operation. That is, the data read speed used during the normal playback operation is also used during the video CD copy operation. Thus, when a copy operation between optical discs is performed, there is a problem in that a long time is taken to complete the copy operation, where this time is equal to the time required for carrying out the playback operation.

SUMMARY OF THE INVENTION

Therefore, the present invention has been made in view of the above and other problems, and it is one object of the present invention to provide a method capable of reducing a time period required for carrying out a copy operation when data recorded on a video CD is copied to another optical disc.

It is another object of the present invention to provide a method for variably controlling a data read speed to a maximum data read speed supportable by an optical disc drive when data recorded on a video CD is copied to another optical disc.

It is another object of the present invention to provide a method and apparatus for controlling a data read speed of a disc copy operation, which overcome the problems and limitations associated with the related art.

In accordance with an aspect of the present invention, the above and other objects can be accomplished by the provision of a method for variably controlling a data read speed in an optical disc drive, the optical disc drive being controlled by a control command set including one read command, the method comprising determining whether or not the read command has been issued; if the determining step determines that the read command has been issued, examining additional information associated with the read command; and variably controlling a data read speed for an optical disc according to the additional information.

According to an aspect of the present invention, there is provided a method of controlling a data read speed of a disc device, the method comprising receiving a read command along with additional information, and increasing the data read speed of the disc device if the additional information indicates that a disc copy operation is requested.

According to an aspect of the present invention, there is provided a disc device for controlling a data read speed, the device comprising a controller to receive a read command along with additional information, and a reading unit controlled by the controller, wherein the controller increases a data read speed for an optical disc if the additional information indicates that a disc copy operation is requested.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a flowchart illustrating a method for variably controlling a data read speed in the optical disc drive in accordance with the present invention.

DETAILED DESCRIPTION OF PREFERRED EMBODIMENTS

Now, a method for variably controlling a data read speed in an optical disc drive in accordance with preferred embodiments of the present invention will be described in detail with reference to the annexed drawings.

Figure 1:
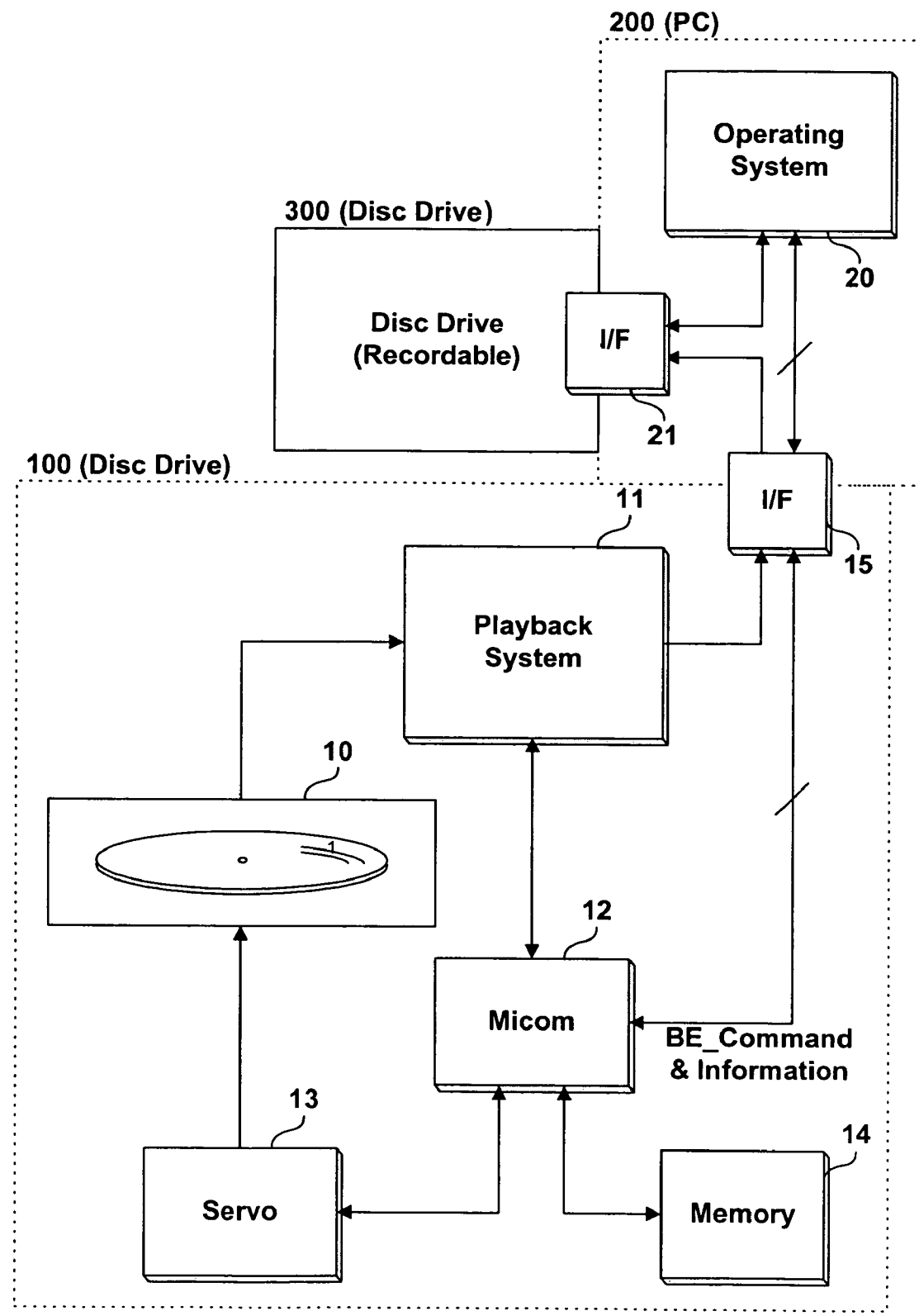
FIG. 1 is a block diagram illustrating a state in which an optical disc drive to which the present invention is applied is coupled to a personal computer (PC)

FIG. 1 shows an example of an optical disc drive coupled to a PC according to an embodiment of the present invention. As shown in FIG. 1, a method for variably controlling a data read speed in an optical disc drive according to the present invention can be applied in the case where a first optical disc drive 100 and a second optical disc drive 300 are mounted and used in a personal computer (PC) 200. These devices and their components are operatively coupled.

The first optical disc drive 100 comprises an optical disc tray 10, a playback system 11, a microcomputer (Micom) 12, a servo 13, a memory 14 and an interface 15. The playback system 11 reads data recorded on an optical disc, for example, a video CD, inserted into the disc drive 100 on the optical disc tray 10, and performs a signal processing operation on the read data.

According to the present invention, the microcomputer 12 receives a read command issued from an operating system (OS) within the PC 200, for example, a BE command, and additional information issued along with the BE command. Subsequently, the microcomputer 12 refers to the received BE command and the received additional information and then variably controls a data read speed to a maximum data read speed if it is determined that a request has been made to copy the data of a video CD to another optical disc.

Figure 2:
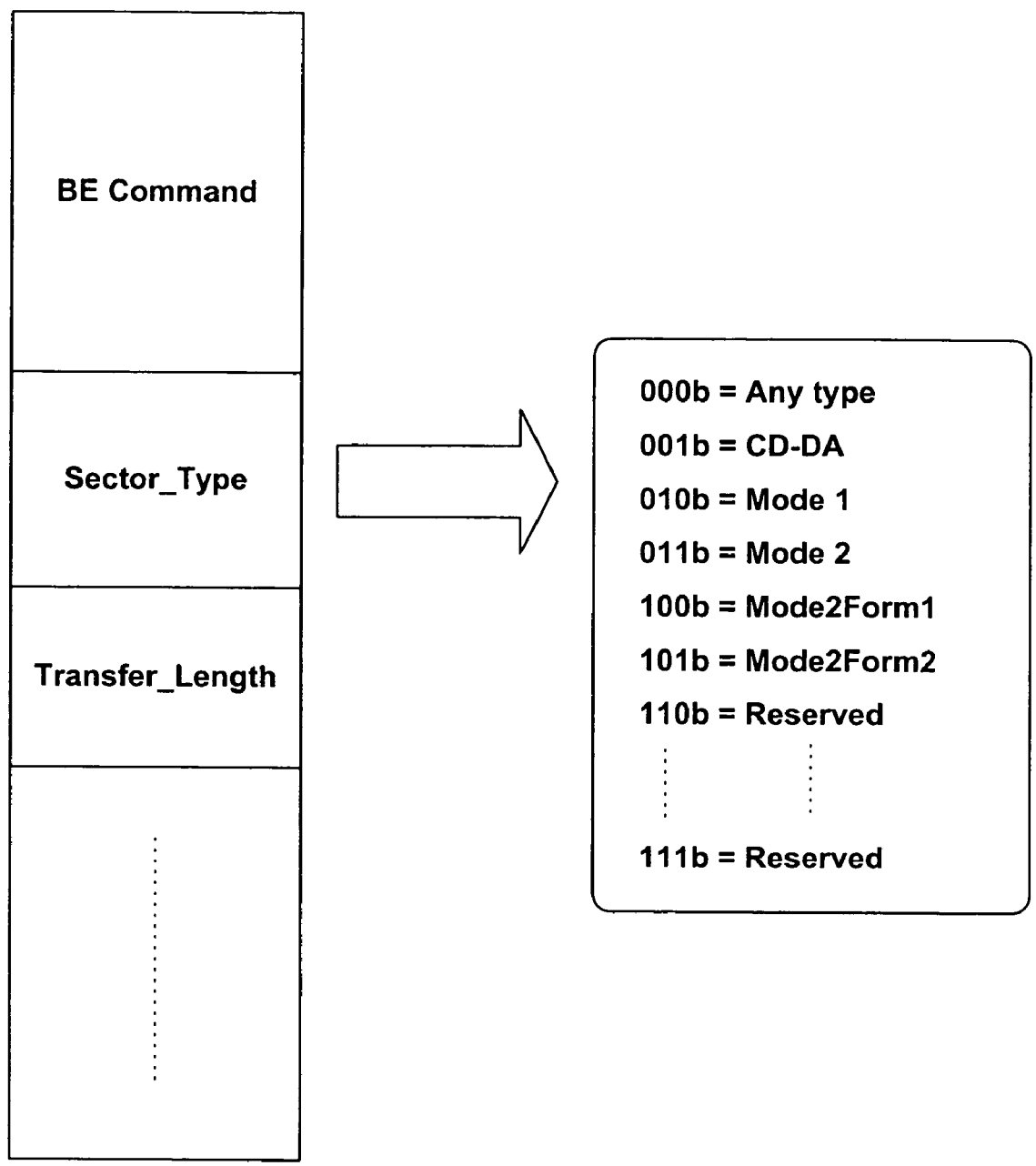
FIG. 2 shows a BE command, sector type information and transfer length information applied to the present invention.

In a command set defined in the advanced technology attachment packet interface (ATAPI) standard, the BE command issued for reproducing or copying data of the video CD is accompanied by sector type information (Sector_Type) and transfer length information (Transfer_Length) necessary for discriminating between a playback operation and a copy operation as shown in FIG. 2. The transfer length information (Transfer_Length) identifies a size of data to be read and transferred by the optical disc drive.

Referring to FIG. 2, according to the present invention in the sector type information (Sector_Type), "001b" (CD-DA) indicates a normal audio CD; "010b" (Mode1), "011b" (Mode2) and "100b" (Mode2Form1) indicate a data CD; and "101b" (Mode2Form2) indicates a video CD.

As a tool for recording data on an optical disc, there are a Roxio's Easy CD Creator, an Ahead Software's Nero Ultra Edition, etc. Sector type values or transfer length values, which follow the issued BE commands, may differ from one recording tool to another, but they can be generalized as follows.

A BE command accompanied by "Sector_Type=101b" is a command for reproducing data of the video CD, while a BE command accompanied by "Sector_Type=000b" is a command for copying data of the video CD.

Because data of the video CD is reproduced in units of a block, generally a BE command accompanied by "Transfer_Length=1 block" is issued when it is reproduced during a normal playback operation. Otherwise, when a BE command accompanied by a "Transfer_Length" value larger than the 1-block Transfer_Length value is issued, it can be determined that the BE command has been issued for a copy operation or another operation rather than a playback operation of the video CD. Here, when "Transfer_Length=1 block" is repeatedly issued for a predetermined number of times or more as one second corresponds to 75 blocks, it can be determined that the BE command has been issued for the playback operation for reproducing data of the video CD.

As shown in FIG. 2, when a read command (i.e., a BE command) from the OS is sent, the microcomputer 12 receives and analyzes sector type information (Sector_Type) indicating the type of the optical disc and data size information (Transfer_Length) indicating the size of data read and transferred from the optical disc drive. Sector_Type and Transfer_Length are sent along with the BE command according to the present invention.

According to the present invention, when Sector_Type=101b, the microcomputer 12 determines that a normal playback operation for the video CD has been requested and then variably controls a data read speed to a low data read speed to carry out the requested normal playback operation on the video CD. On the other hand, when Sector_Type=000b, the microcomputer 12 determines whether or not a copy operation for the video CD has been requested and then variably controls a data read speed to the maximum data read speed according to the result of this determination. These operations are described in detail as below.

FIG. 3 is a flow chart illustrating a method for variably controlling a data read speed in an optical disc drive in accordance with the present invention. The method of FIG. 3 is applied to the set-up of FIG. 1, but can be applied to other disc drive(s) and set-ups. In the present case, a disc inserted in the first disc drive 100 is a video CD.

Referring to FIGS. 1 and 3, the microcomputer 12 provided in the first optical disc drive 100 receives and confirms a command issued from the OS 20 of the PC 200 (S10). If the microcomputer 12 determines that the received command is not a BE command (S11), an operation corresponding to the received command is performed (S12).

On the other hand, when the received command is a BE command (S11), the microcomputer 12 examines sector type information (Sector_Type) received along with the BE command. For example, if Sector_Type=101b (S13), the microcomputer 12 determines that a normal playback operation for the video CD has been requested, and then controls or sets a data read speed of the first optical disc drive 100 to a low data read speed (e.g., 2×) corresponding to the normal playback operation (S14).

Otherwise, if Sector_Type=000b (S15), the microcomputer 12 examines transfer length information (Transfer_Length) received along with the sector type information (Sector_Type). For example, if Transfer_length≈1 block (S16), the microcomputer 12 determines that a copy operation for the video CD has been requested and variably controls the data read speed of the first optical disc drive 100 to a maximum data read speed (e.g., 32×) (S18).

But, if Sector_Type=000b and Transfer_Length=1 block, the microcomputer 12 determines whether or not Transfer_Length=1 block is repeatedly issued for a predetermined number (N) of times or more (e.g., N=50) (S17). If it is determined at step S17 that Transfer_Length=1 block is repeatedly issued for the predetermined number of times or more, the microcomputer 12 controls a data read speed of the first optical disc drive 100 to a low data read speed (e.g., 2×) corresponding to the normal playback operation (S14).

On the other hand, if it determined at step S17 that Transfer_Length=1 block information is not repeatedly issued for the predetermined number of times or more, the microcomputer 12 determines that a copy operation for the video CD has been requested and then variably controls or sets the data read speed of the first optical disc drive 100 to the maximum data read speed (e.g., 32×) or a preset high data read speed (S18).

Thus, when Sector_Type=101b, or when the Sector_Type=000b and Transfer_Length=1 block is consecutively repeated for the predetermined number of times or more, the data read speed of the optical disc is controlled to the low data speed. Otherwise, when the transfer length information (Transfer_Length) has a value larger than a 1-block transfer length value (Transfer_Length=1 block) or Transfer_Length=1 block is not consecutively or repeatedly issued for the predetermined number of times while Sector_Type=000b, the data read speed is variably controlled to the maximum (or higher) data read speed and the copy operation for the video CD can be rapidly performed.

Although the method of FIG. 3 has been discussed in view of controlling a copy operation for a video CD, it can be applied to other types of discs. For instance, if it is applied to an audio CD, then step S13 in FIG. 3 may be a step of determining if Sector_Type='001b'. Other steps of FIG. 3 may be the same.

As discussed above, according to the present invention, data recorded on a video CD is read at the maximum data read speed supportable by an optical disc drive and a copy operation for the read data is rapidly performed, when data recorded on the video CD is copied to another optical disc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for variably controlling a data read speed in an optical disc drive for a first optical disc, the optical disc drive being controlled by a control command set including a read command and additional information associated with the read command, the method comprising:
    determining whether or not the read command has been received, the read command and the additional information respectively being a command and information for copying data recorded on the first optical disc to a second optical disc, the additional information including type information of the first optical disc and size information of the data to be copied from the first optical disc to the second optical disc;
    if the determining step determines that the read command has been received, examining the additional information; and
    variably controlling the data read speed according to the type information of the first optical disc and the size information of the data to be copied from the first optical disc,
    wherein the read command and the additional information are received from a personal computer equipped with both the disc drive for driving the first optical disc and another disc device for driving the second optical disc, and
    wherein the step of variably controlling the data read speed comprises:
        determining whether the type information is 101b;
        if the type information is not 101b, determining whether the type information is 000b;
        if the type information is 000b, determining whether the size information is equal to or less than a 1-block value; and
        if the size information is larger than a 1-block value, controlling the data read speed of the first optical disc to be a maximum data read speed.

2. The method of claim 1, wherein in the variably controlling step, the data read speed for the first optical disc is controlled to a low data read speed when the type information of the first optical disc corresponds to a video compact disc.

3. The method of claim 1, further comprising:
    determining that the size information of data to be copied from the first optical disc is equal to or less than a 1-block value;
    receiving the size information for a predetermined number of times; and
    in the variably controlling step, controlling the data read speed of the first optical disc to be less than a maximum data read speed.

4. The method of claim 1, further comprising:
    determining that the size information of data to be copied from the first optical disc is equal to or less than a 1-block value;
    determining that the size information is not repeatedly received for a predetermined number of times; and
    in the variably controlling step, controlling the data read speed for the optical disc to be a maximum data read speed.

5. The method of claim 1, wherein the variably controlling step includes adjusting the data read speed to a maximum data read speed.

6. The method of claim 1, wherein the step of variably controlling the data read speed comprises:
    copying the data from the first optical disc to the second optical disc.

7. A method of controlling a data read speed of a disc device for driving a first optical disc, the method comprising:
    receiving a read command along with additional information, the read command and the additional information respectively being a command and information for copying data recorded on the first optical disc to a second optical disc, the additional information including type information of the first optical disc and size information of the data to be copied from the first optical disc to the second optical disc;
    analyzing the additional information; and
    increasing the data read speed of the disc device based on the type information of the first optical disc and the size information of the data to be copied from the first optical disc,
    wherein in the receiving step, the disc device receives the read command and the additional information from a personal computer equipped with both the disc device for driving the first optical disc and another disc device for driving the second optical disc, and
    wherein the step of increasing the data read speed comprises:
        determining whether the type information is 101b;
        if the type information is not 101b, determining whether the type information is 000b;
        if the type information is 000b, determining whether the size information is equal to or less than a 1-block value; and
        if the size information is larger than a 1-block value, controlling the data read speed of the first optical disc to be a maximum data read speed.

8. The method of claim 7, wherein the increasing step includes increasing the data read speed of the disc device to a maximum data read speed of the disc device.

9. The method of claim 7, wherein, based on the analyzing step, the increasing step increases the data read speed if the size information is equal to or less than one block and the size information is not received for a predetermined number of times.

10. The method of claim 7, wherein the first optical disc is a video compact disc.

11. The method of claim 7, wherein the step of increasing the data read speed comprises:
    copying the data from the first optical disc to the second optical disc.

12. A disc device for controlling a data read speed of a first optical disc, the device comprising:
    a controller configured to receive a read command along with additional information, the read command and the additional information respectively being a command and information for copying data recorded on the first optical disc to a second optical disc, the controller configured to analyze the additional information, the additional information including type information of the first optical disc and size information of data to be copied from the first optical disc to the second optical disc; and
    a reading unit controlled by the controller,
    wherein the controller is configured to:
        determine whether the type information is 101b, if the type information is not 101b, determine whether the type information is 000b, if the type information is 000b, determine whether the size information is equal to or less than a 1-block value, and if the size information is larger than a 1-block value, control the data read speed of the first optical disc to be a maximum data read speed.

13. The device of claim 12, wherein the controller is configured to receive the read command and the additional information from a personal computer equipped with both the disc drive for driving the first optical disc and another disc device for driving the second optical disc.

14. The device of claim 12, wherein the controller is configured to increase the data read speed if the controller determines the type information indicates a type of the first optical disc and if the controller determines the size information is equal to or less than one block and the size information is not received for a predetermined number of times.

15. The device of claim 12, wherein the optical disc is a video compact disc.

16. The device of claim 12, wherein the controller is configured to copy the data from the first optical disc to the second optical disc.

* * * * *